(12) United States Patent  (10) Patent No.: US 7,882,448 B2
Haug  (45) Date of Patent: Feb. 1, 2011

(54) TASKBAR CONFIGURATION TOOL FOR COMPUTER SYSTEMS

(75) Inventor: Tobias Haug, Heldelberg (DE)

(73) Assignee: SAP AG, Walldorf (DE)

( * ) Notice: Subject to any disclaimer, the term of this patent is extended or adjusted under 35 U.S.C. 154(b) by 722 days.

(21) Appl. No.: 11/319,790

(22) Filed: Dec. 29, 2005

(65) Prior Publication Data

US 2007/0157099 A1    Jul. 5, 2007

(51) Int. Cl.
*G06F 3/00* (2006.01)
(52) U.S. Cl. .................. 715/779; 715/810; 715/780; 715/781; 715/835; 715/864
(58) Field of Classification Search ................ 715/779, 715/769, 810, 864, 835; 717/168
See application file for complete search history.

(56) References Cited

U.S. PATENT DOCUMENTS

| | | | | |
|---|---|---|---|---|
| 5,617,526 A * | 4/1997 | Oran et al. | | 715/779 |
| 5,644,737 A * | 7/1997 | Tuniman et al. | | 715/810 |
| 5,920,316 A * | 7/1999 | Oran et al. | | 715/779 |
| 6,020,884 A * | 2/2000 | MacNaughton et al. | | 715/747 |
| 6,151,024 A * | 11/2000 | Alimpich et al. | | 715/854 |
| 6,493,002 B1 * | 12/2002 | Christensen | | 715/779 |
| 6,704,031 B1 * | 3/2004 | Kimball et al. | | 715/745 |
| 6,918,091 B2 * | 7/2005 | Leavitt et al. | | 715/765 |
| 7,003,726 B2 * | 2/2006 | Walker et al. | | 715/717 |
| 7,047,501 B2 * | 5/2006 | Morcos et al. | | 715/779 |
| 7,665,031 B2 * | 2/2010 | Matthews et al. | | 715/779 |
| 7,669,140 B2 * | 2/2010 | Matthews et al. | | 715/779 |
| 7,793,227 B2 * | 9/2010 | Wada et al. | | 715/779 |
| 2001/0035882 A1 * | 11/2001 | Stoakley et al. | | 345/779 |
| 2004/0135812 A1 * | 7/2004 | Tai et al. | | 345/779 |
| 2005/0132299 A1 * | 6/2005 | Jones et al. | | 715/759 |
| 2005/0246654 A1 * | 11/2005 | Hally et al. | | 715/779 |
| 2005/0262449 A1 * | 11/2005 | Anderson et al. | | 715/779 |
| 2005/0278655 A1 * | 12/2005 | Sims | | 715/792 |
| 2006/0095865 A1 * | 5/2006 | Rostom | | 715/810 |
| 2006/0224989 A1 * | 10/2006 | Pettiross et al. | | 715/779 |
| 2007/0186176 A1 * | 8/2007 | Godley | | 715/764 |
| 2008/0082937 A1 * | 4/2008 | Bennah et al. | | 715/781 |

* cited by examiner

*Primary Examiner*—William L Bashore
*Assistant Examiner*—Meseker Takele
(74) *Attorney, Agent, or Firm*—Kenyon & Kenyon LLP

(57) ABSTRACT

A taskbar control permits system operators to group application instances according to their own preferences. The taskbar control system groups application instances according to a default grouping scheme but permit the default grouping to be managed by operator control. The operator may move application instances among groups or to new groups via drag and drop commands, commands entered through context menus and the like.

23 Claims, 4 Drawing Sheets

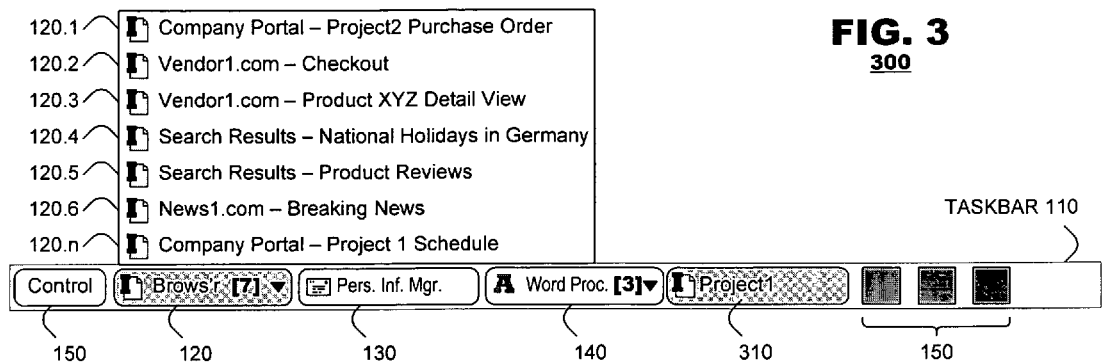
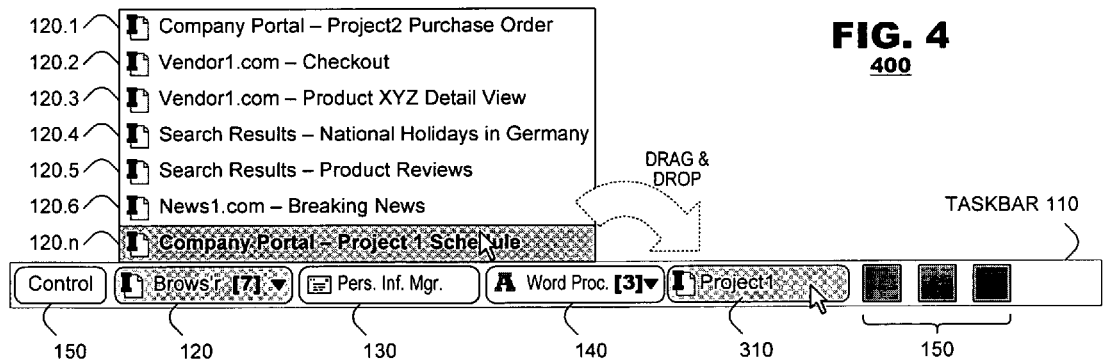

500

600

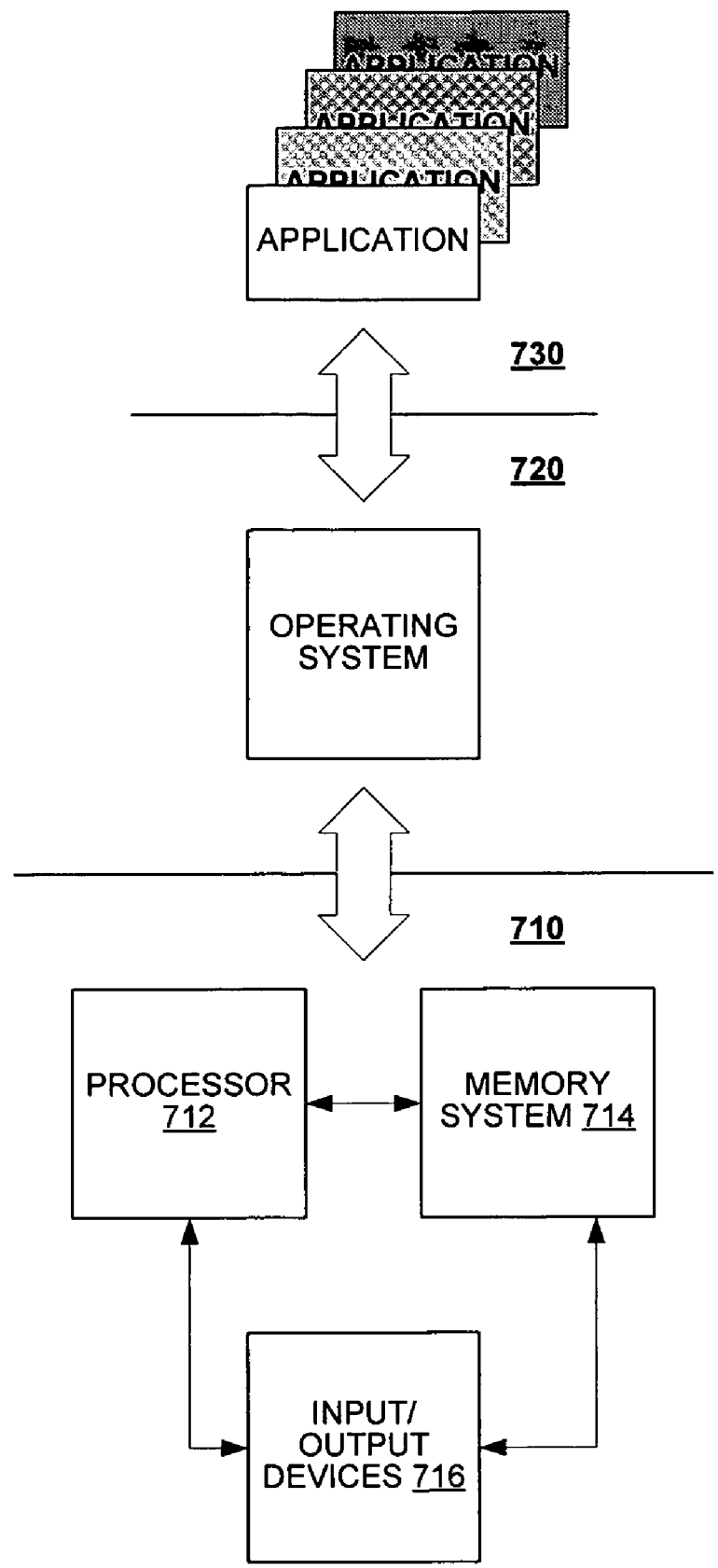

TASKBAR CONFIGURATION TOOL FOR COMPUTER SYSTEMS

BACKGROUND

The present invention relates to computer system control and, more specifically, to management of application programs via an operating system.

Modern computer systems use graphical user interfaces (GUIs) to permit operators to exercise control over the computer systems. In one popular GUI, a desktop may include a taskbar and a workspace. The workspace may include various icons representing computer resources, application programs and operator work product (documents). The taskbar includes various control pathways, status indicators and taskbar groups. The taskbar groups identify application programs that currently are open and executing on the computer system. There is a separate group provided for each type of application program. If multiple instances of the application program are open (e.g., there are multiple browser pages open simultaneously or an operator has opened multiple word processing documents), the computer system collects each application instance within a common group and displays a single group indicator on the taskbar to represent the collection. The groups provide a convenient tool to permit operators to navigate among the application programs and application instances, particularly when such navigation must be performed repeatedly.

Although taskbar groups provide a convenient tool for navigation, the collection of application instances based on an application type is not always intuitive for an operator. When a large number of application instances are open simultaneously (e.g., an operator has opened a dozen or more browser windows and multiple document types), it can be difficult to navigate among the various taskbar entities. Text identifiers often describe the contents of each application incompletely. Additionally, at given points in time, operators may need to navigate among a much smaller set of application instances than are open. The static taskbar grouping assignments, therefore, can be inconvenient to computer operators.

Accordingly, there is a need in the art for a taskbar management tool in computer systems that permits computer operators to define taskbar group assignments in a flexible manner and tailor them to suit their individual needs.

BRIEF DESCRIPTION OF THE DRAWINGS

FIGS. 1-6 illustrate exemplary taskbars according to embodiments of the present invention.

FIG. 7 is an illustration of a control hierarchy of a computer system.

DETAILED DESCRIPTION

Embodiments of the present invention provide a taskbar management tool for use in a computer system. The tool may display a taskbar on a computer display which includes group identifiers each representing a collection of application instances. The tool includes command pathways through which an operator may move application instances arbitrarily among taskbar groups and create new taskbar groups to suit the operator's needs.

Figure 1:
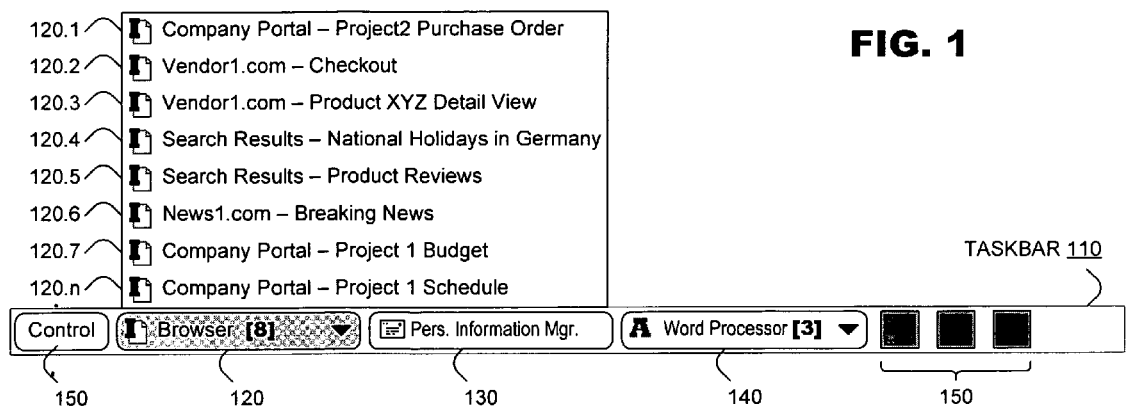
Figure 2:
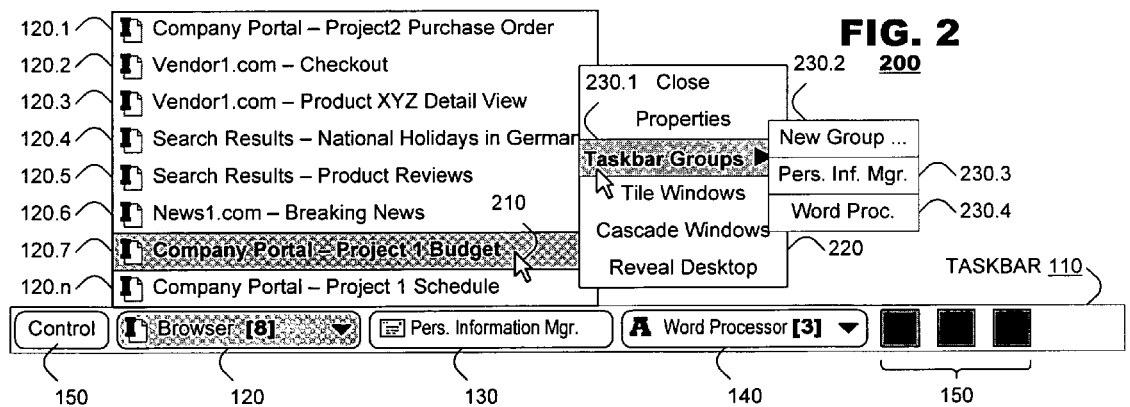

FIGS. 1-3 illustrate an exemplary taskbar interface 100 according to an embodiment of the present invention. In FIG. 1, a taskbar 110 illustrates various group identifiers 120, 130, 140. The group identifiers 120, 130, 140 may represent applications active on a computer system and initially may be grouped according to application type. Three group identifiers are illustrated in FIG. 1. They represent a browser application, personal information management application and word processing application respectively. User interaction with a group identifier 120.1 may cause the computer system to display a pop up window that identifies each of the application instances 120.1-120.n that are collected within the group identifier 120.1 In the example of FIG. 1, eight instances of the browser application 120 are shown as active concurrently. The taskbar 110 may include other computer controls 150, representing operating system controls, system status indicators or other functionality as may be desired. In this regard, the operation of computer taskbars 110 is well known.

Embodiments of the present invention introduce a taskbar control that permits system operators to group application instances according to their own preferences. The taskbar control system no longer groups application instances according to a static grouping scheme.

Instead, the system may group application instances according to a default grouping scheme but permit the default grouping to be managed by operator control.

FIG. 2 illustrates a grouping control 200 that may be performed according to an embodiment of the present invention. An operator may interact with a desired one of the application instances and enter a command to the computer system to manage taskbar groupings. In the example of FIG. 2, an operator may position a cursor 210 over a group entry (say, 120.7) and invoke a context menu 220 with respect to the group entry 120.7. The context menu 220 may include a command path 230.1 to permit the operator to manage taskbar groupings. The operator may command the computer system to create a new group (230.2). In response, the computer system may create a new group on the taskbar 110 and move the selected group entry 120.7 from its prior group to the new group. The operator may command the computer system to add the application instance to a previously-defined group (230.3, 230.4), in which case the computer system moves the selected group entry between groups as commanded.

FIG. 3 illustrates a group identifier 310 for a new taskbar group that might be created from the example of FIG. 2. There, the taskbar 110 illustrates group identifier 310 in addition to the group identifiers 120, 130, 140 from FIGS. 1 and 2. The "Project 1 Budget" entry 120.7 from FIG. 2 no longer appears in the pop up menu for the browser 120. Instead, it will occur within a pop up menu for the new taskbar group 310 when activated (not shown in the example of FIG. 3).

Embodiments of the present invention also permit operators to label the taskbar groups in a manner that is intuitive to them. For example, prior to creation of a new taskbar group, the computer system may prompt the operator for a group label. Alternatively, it may create a group label according to default process but permit the operator to re-label the group upon command (for example, by a slow double click of the taskbar group).

According to the foregoing embodiments, taskbar groups may be organized according to arbitrary selection schemes that are defined by computer operators. The taskbar grouping scheme is expected to be particularly useful for computer user that operate on multiple projects concurrently. For users that face repeated interruptions in their work, an operator-defined taskbar grouping scheme may provide a convenient tool for operators to track their progress on a given task and to switch among projects.

Consider an example where an operator works on two projects concurrently, labeled "project 1" and "project 2." On project 1, the operator may be required to prepare a schedule for the project, which involves coordination of personnel schedules and vendor resources. As part of this operation, the operator may open several applications and several instances of the various applications to develop the schedule. FIG. 1, for example, illustrates various browser instances 120.2, 120.3, 120.4, 120.5, 120.n that might be directed to such functions. In these browser instances, the operator may have opened a portal to his own company network to review schedule information, may have performed open Internet searches to identify products needed to perform the project and may have opened portals to his company's vendors to purchase the projects. Similarly, the operator may have opened word processing documents (not shown) that contain bid documents or other data relevant to project 1.

Continuing with the example, the user may be interrupted from his work on Project 1 by an event that occurs with respect to Project 2. Again, the operator may invoke network resources—applications and application instances—to address issues involved with respect to Project 2. The example of FIG. 1 identifies a browser instance 120.1 representing investigation of a purchase order for project 2. The operator may return to his work on project 1 after some delay and, otherwise, may find it difficult to navigate among the various application instances to determine how much progress was made before he was interrupted. By grouping the application windows according to tasks, however, the operator may find it easier to retrace his steps and recover from the interruption.

Provision of operator-selected application groupings also provides benefits for application management. For example, when an operator concludes work on a particular project, it may be very convenient to command the computer system to close all related application instances with a single command. Such functionality is not possible with static taskbar group assignments. However, in a system where application instances are grouped on project bases or task bases, an operator may close all related application instances with a common close command entered against the taskbar group indicator 310 itself, typically via another context menu (not shown).

Embodiments of the present invention provide alternative command pathways to permit operators to create and modify taskbar groups. In the simplest example, illustrated in FIG. 4, an operator may manage groupings by drag and drop operations. An operator may 'grab' an entry (say, entry 120.n from FIG. 4) by positioning a cursor over the entry 120.n and entering a selection command (typically, clicking on a mouse button). While the entry 120.n is selected, the operator may move the cursor to a release position and enter a command representing a drop of the entry 120.n (typically, releasing the mouse button). In response, the computer system may move the selected entry 120.n to the taskbar grouping so identified. In the example, of FIG. 4, if the operator releases the entry 120.n while the cursor is positioned over a taskbar group indicator 310, the computer system moves the entry 120.n to the identified group. If the operator releases the entry 120.n while the cursor is positioned over the taskbar but not over any previously defined group, the computer system may creates a new group.

Figure 5:
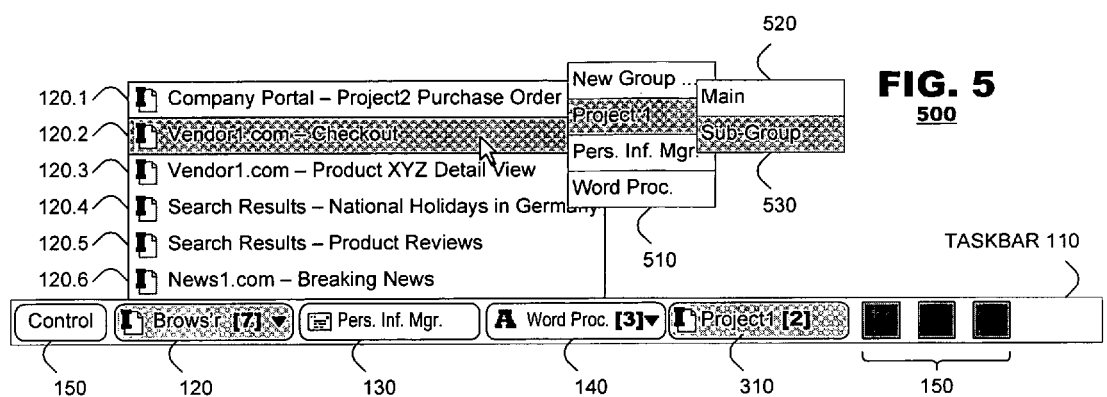
Figure 6:
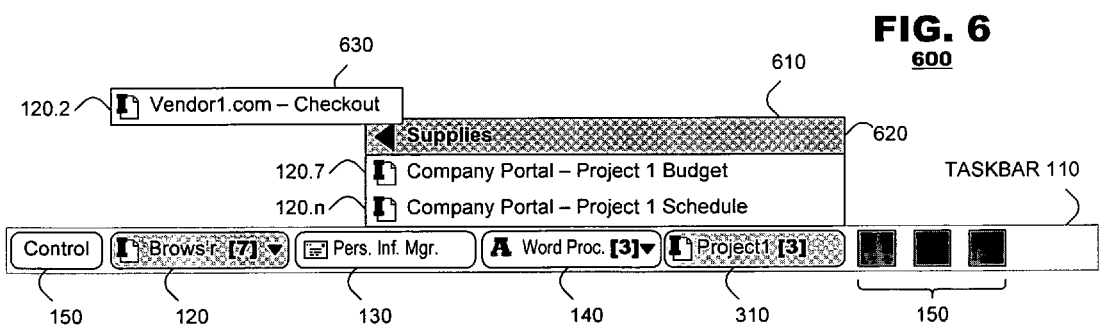

As illustrated in FIG. 5, embodiments of the present invention permit operators to organize applications instances hierarchically within a taskbar group. For example, a context menu 510 for creating taskbar groups may include separate command pathways 520, 530 to permit an operator to assign an application instance to a main group or a sub-group therein. An operator may assign a selected entry 120.2 to a main group or sub-group as desired. Referring to FIG. 6, when an entry is assigned to a sub-group, a taskbar pop up menu 610 may include application instances 120.7, 120.n assigned to the main taskbar group and entries 620 for whatever sub-groups have been defined. User interaction with a sub-group entry may cause the computer system to display contents of the sub-group in an extension 630 to the pop up menu 610.

Embodiments of the present invention also provide an automated group management process that surveys open application instance indicators and clusters them according to content. Referring to the example of FIG. 1, the application instances 120.1-120.n each include text identifiers that help distinguish the application instances from each other. In the context of a browser, the identifiers typically are derived from contents of the pages being viewed t therein (e.g., website URLs or page titles). For word processing applications, the identifiers typically are related to document filenames or titles. In an embodiment of the present invention, the computer system may perform a clustering operation upon the text identifiers of each application to determine whether they exhibit similarities to each other. If so, the computer system may present the results of the clustering operation to an operator and prompt the operator to accept or reject the operation. Upon acceptance, the computer system may realign taskbar groupings to correspond to the results of the clustering operation.

In another embodiment, when a new application instance is opened, the computer system may perform a clustering operation between an identifier of the new application instance against corresponding identifiers of previously-opened application instances. The computer system may assign the application instance to a taskbar group in which the best match is identified.

The foregoing embodiments have been described in the context of a computer system. FIG. 7 is a simplified block diagram of a computer system control hierarchy 700 suitable for use with the foregoing embodiments of the present invention. As illustrated, the control hierarchy 700 may include various hierarchical layers that include a system layer 710, an operating system layer 720 and an application program layer 730. The system layer 710 is populated by computer processors 712, a memory system 714 and various input/output devices 716 that make up the computer hardware. The memory system 714, for example, includes electronic, magnetic and/or optical memory devices that store program instructions representing the operating system 720 and application programs 730. The input/output devices 716 exchange data with computer operators and/or network equipment. For example, the computer system may include pointer devices and text input devices to accept operator commands and input data pursuant to the group management operations described above. The computer system also may include display devices on which the taskbars, taskbar groups and menus for the foregoing embodiments are displayed. The computer system may be provided as a desktop computer, notebook computer, server computer, tablet computer or personal digital assistant.

The operating system provides another layer of computer control. Several operating systems are commercially available from various software vendors, including the Windows operating systems commercially available from Microsoft Corp., the Unix operating system available from Linux and the Palm one operating system available from Palm Corp. The taskbar manipulation techniques described herein may be integrated into an operating system to provide a greater degree of control over computer operations.

The application layer 730 represents various application programs that may be executed by a computer. The browser application, personal information management application and word processing application described above are members of this layer 730. Of course, these are merely illustrative examples. The principles of the foregoing embodiments may be used with any collection of application programs.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. A computer system including:
   memory for storage of program instructions, and
   a processor programmed to:
   execute application programs, and
   produce a user interface, comprising:
   means for opening multiple instances of application programs under user control,
   a taskbar having indicators of application groupings, the indicators of the application groupings representing respective collections of open application program instances, and
   means for organizing the instances of the application programs indicated at the application groupings under user control,
   wherein the means for organizing responds to an operation that selects an indicator of an application instance from a grouping and moves it to the taskbar by creating a new application grouping and assigning the selected application instance to the new application grouping.

2. The computer system of claim 1, wherein the means for organizing responds to a drag and drop operation.

3. The computer system of claim 1, wherein the means for organizing responds to a context menu revealed with respect to a first application grouping.

4. The computer system of claim 3, wherein the context menu includes a prompt to create a new application grouping.

5. The computer system of claim 3, wherein the context menu includes a prompt to create a sub-group within an application grouping.

6. The computer system of claim 1, wherein the user interface provides a prompt to name an application grouping.

7. The computer system of claim 1, wherein the open application program instances are programs that are currently executing on the computer system.

8. The computer system of claim 1, wherein the open application program instances include simultaneously open web pages.

9. The computer system of claim 1, wherein the open application program instances include simultaneously open word processing documents.

10. A computer system including: memory for storage of program instructions, and
    a processor programmed to:
    execute application programs, and
    produce a user interface, comprising:
    means for opening multiple instances of application programs under user control,
    a taskbar having indicators of application groupings, the indicators of the application groupings representing respective collections of open application program instances, and
    means for organizing the instances of the application programs indicated at the application groupings under user control,
    wherein the means for organizing responds to an drag and drop operation that selects an indicator of an application instance from a first application grouping and moves the indicator of the application instance to a second taskbar indicator by reassigning the selected application instance from the first application grouping to a second application grouping corresponding to the second taskbar indicator.

11. The method of claim 10, wherein the means for organizing responds to a drag and drop operation.

12. The computer system of claim 10, wherein the means for organizing responds to a context menu revealed with respect to a first application grouping.

13. The computer system of claim 12, wherein the context menu includes a prompt to move a selected entry to another application grouping.

14. A method, comprising:
    displaying a taskbar on a computer display, the taskbar displaying group identifiers each representing a collection of application instances executing on the computer,
    in response to operator interaction with a group identifier, displaying a first taskbar group in a popup window, including displaying identifiers of each application instance currently executing on the computer and assigned to the first taskbar group; and
    in response to an operator interaction with one of the displayed identifiers reassigning the identifier from a first taskbar group to a second taskbar group.

15. The method of claim 14, further comprising prior to the reassigning: in response to a prior operator selection of a group identifier, displaying a selected taskbar group in a popup window, the taskbar group including displayed identifiers of each application instance that is currently executing on the computer and associated with the selected group identifier; in response to an operator induced drag and drop operation that drags a selected application identifier from the displayed taskbar group to the taskbar, creating the second taskbar group on the taskbar that includes the selected application identifier and reassigning the application identifier from the first taskbar group to the second taskbar group.

16. The method of claim 14, wherein the reassigning occurs in response to a drag and drop command from an operator.

17. The method of claim 14, wherein the reassigning occurs in response to an operator selection of a command from a context menu revealed with respect to a first taskbar group.

18. The method of claim 17, where in the context menu includes a prompt to create a new taskbar group.

19. The method of claim 17, wherein the context menu includes a prompt to create a sub-group within a taskbar group.

20. The method of claim 17, wherein the context menu includes a prompt to move a selected entry to another taskbar group.

21. The method of claim 14, further comprising renaming the second taskbar group in response to a user command.

22. A method, comprising: displaying a taskbar on a computer display, the taskbar displaying a plurality of group identifiers each representing a collection of application instances executing on the computer, in response to operator selection of a group identifier, displaying a first taskbar group in a popup window, the taskbar group including displayed identifiers of each application instance that is currently executing on the computer and associated with the selected group identifier;

in response to an operator induced drag and drop operation that drags a selected application identifier from the displayed taskbar group to the taskbar, displaying a new taskbar group on the taskbar that includes the selected application identifier and reassigning the application identifier from the first taskbar group to the new taskbar group.

23. The method of claim 22, further comprising, after the new taskbar group is displayed: in response to new operator selection of a group identifier, displaying a selected taskbar group in a respective popup window, the selected taskbar group including displayed identifiers of each application instance that is currently executing on the computer and associated with the newly selected group identifier;

in response to an operator induced drag and drop operation that drags an application identifier from the selected taskbar group to the new taskbar group, reassigning the application identifier from the selected taskbar group to the new taskbar group.

* * * * *